US006827754B2

(12) United States Patent
Suwabe et al.

(10) Patent No.: US 6,827,754 B2
(45) Date of Patent: Dec. 7, 2004

(54) CERAMIC HONEYCOMB FILTER

(75) Inventors: Hirohisa Suwabe, Fukuoka-ken (JP); Yasuhiko Otsubo, Fukuoka-ken (JP); Shinya Tokumaru, Fukuoka-ken (JP); Hiroshi Funabashi, Tokyo (JP); Keiichi Nakagome, Tokyo (JP); Makoto Tsujita, Tokyo (JP); Hisaki Torisaka, Tokyo (JP)

(73) Assignees: Hitachi Metals, Ltd., Tokyo (JP); Hino Motors, Ltd., Tokyo (JP)

( * ) Notice: Subject to any disclaimer, the term of this patent is extended or adjusted under 35 U.S.C. 154(b) by 0 days.

(21) Appl. No.: 10/241,685

(22) Filed: Sep. 12, 2002

(65) Prior Publication Data

US 2003/0093982 A1 May 22, 2003

(30) Foreign Application Priority Data

Sep. 13, 2001 (JP) ....................................... 2001-278691
Oct. 3, 2001 (JP) ....................................... 2001-307098
Oct. 29, 2001 (JP) ....................................... 2001-331421

(51) Int. Cl.[7] ................................................ B01D 39/20

(52) U.S. Cl. ........................ 55/523; 55/282.3; 55/385.3; 55/DIG. 10; 55/DIG. 30; 60/311

(58) Field of Search ............................. 55/282.3, 385.3, 55/523, 524, DIG. 10, DIG. 30; 60/297, 311; 501/9

(56) References Cited

U.S. PATENT DOCUMENTS 4,329,162 A * 5/1982 Pitcher, Jr. .................... 55/523
4,428,758 A * 1/1984 Montierth ..................... 55/523
4,519,820 A * 5/1985 Oyobe et al. .................. 55/523
4,568,402 A * 2/1986 Ogawa et al. ............... 501/119
4,632,683 A * 12/1986 Fukutani et al. .............. 55/523
5,114,581 A * 5/1992 Goldsmith et al. ........... 55/523
5,198,006 A * 3/1993 Mimori et al. ................ 55/523

(List continued on next page.)

FOREIGN PATENT DOCUMENTS

EP 0 043 694 B1 12/1986
EP 0 640 391 A2 * 3/1995 ........... B01D/53/72
EP 0 677 498 A2 * 10/1995 ............. F01N/3/02

(List continued on next page.)

OTHER PUBLICATIONS

H. Hashiguchi and M. Furubayashi (Yokohama National University)(Hashiguchi) in the collected reprints 911(—911001–199996—)Characteristics of Diesel Particulate filter (1st Report); presented at the Spring Meeting of Scientific Lectures in 1991 held on May 21 and 22, 1991.

*Primary Examiner*—Duane Smith
*Assistant Examiner*—Jason M. Greene
(74) *Attorney, Agent, or Firm*—Sughrue Mion, PLLC

(57) ABSTRACT

A ceramic honeycomb filter comprising a ceramic honeycomb structure having porous partition walls defining a plurality of flow paths for flowing an exhaust gas through the porous partition walls to remove particulates from the exhaust gas, the predetermined flow paths among the flow paths being sealed at their ends, a catalyst being carried by the porous partition walls, the porous partition walls having a porosity of 60–75% and an average pore diameter of 15–25 μm when measured according to a mercury penetration method, and the maximum of a slope $S_n$ of a cumulative pore volume curve of the porous partition walls relative to a pore diameter obtained at an n-th measurement point being 0.7 or more, the $S_n$ being represented by the following formula (1):

$$S_n=-(V_n-V_{n-1})/[\log D_n-\log (D_{n-1})] \quad (1),$$

wherein $D_n$ is a pore diameter (μm) at an n-th measurement point, $D_{n-1}$ is a pore diameter (μm) at an (n−1)-th measurement point, $V_n$ is a cumulative pore volume ($cm^3/g$) at an n-th measurement point, and $V_{n-1}$ is a cumulative pore volume ($cm^3/g$) at an (n−1)-th measurement point.

14 Claims, 11 Drawing Sheets

U.S. PATENT DOCUMENTS

| | | | | | |
|---|---|---|---|---|---|
| 5,720,787 | A | | 2/1998 | Yamada et al. | |
| 6,227,382 | B1 | * | 5/2001 | Cutler et al. | 210/473 |
| 6,261,982 | B1 | * | 7/2001 | Takahashi et al. | 55/523 |
| 6,541,407 | B2 | * | 4/2003 | Beall et al. | 55/523 |

FOREIGN PATENT DOCUMENTS

| | | | | |
|---|---|---|---|---|
| JP | 58-045715 | | 3/1983 | |
| JP | 61-129015 | | 6/1986 | |
| JP | 05-118211 | | 5/1993 | |
| JP | 05-254962 | | 10/1993 | |
| JP | 06-055021 | | 3/1994 | |
| JP | 08-281036 | | 10/1996 | |
| JP | 09-077573 | | 3/1997 | |
| JP | 09-158710 | | 6/1997 | |
| JP | 10-99626 | * | 4/1998 | B01D/46/00 |
| JP | 2002-143615 | | 5/2002 | |
| WO | WO 00/76939 A1 | * | 12/2000 | C04B/35/195 |

* cited by examiner

CERAMIC HONEYCOMB FILTER

FIELD OF THE INVENTION

The present invention relates to a ceramic honeycomb filter for removing particulates from an exhaust gas from diesel engines.

BACKGROUND OF THE OPTION

To remove particulates from an exhaust gas emitted from diesel engines, investigation has been made to use ceramic honeycomb filters having porous partition walls through which the exhaust gas containing particulates is caused to flow. Such filters are called particulates-capturing filters (diesel particulate filters). FIG. 2(*a*) is a front view showing a ceramic honeycomb filter 11 as a particulates-capturing filter, FIG. 2(*b*) is a partially cross-sectional side view showing the ceramic honeycomb filter 11 of FIG. 2(*a*), and FIG. 3 is a schematic cross-sectional view showing the ceramic honeycomb filter 11 of FIG. 2. As shown in FIGS. 2 and 3, a substantially cylindrical ceramic honeycomb filter 11 comprises an outer peripheral wall 11*a*, and porous partition walls 11*b* disposed inside the outer peripheral wall 11*a*, with flow paths 11*c* surrounded by the outer peripheral wall 11*a* and the porous partition walls 11*b* or by the adjacent porous partition walls 11*b* sealed alternately by sealers 12*a*, 12*b* at inlet-side ends 11*d* and outlet-side ends 11*e*. The outer peripheral wall 11*a* of the ceramic honeycomb filter 11 supported by holding members 13*a*, 13*b* are received in a metal housing 14.

An exhaust gas containing particulates flows into the flow paths 11*c* of the ceramic honeycomb filter 11 through the inlet-side ends 11*d* (shown by 10*a*), passes through the porous partition walls 11*b*, and goes out of the adjacent flow paths 11*c* through the outlet-side ends 11*e* (shown by 10*b*). In this process, particulates contained in the exhaust gas are captured by pores in the porous partition walls 11*b*. When the captured particulates are excessively accumulated in the ceramic honeycomb filter 11, the pressure loss of the filter 11 increases, likely resulting in decrease in an engine output. Accordingly, the captured particulates are periodically burned by an external igniting means such as an electric heater and a burner to regenerate the ceramic honeycomb filter 11. Generally employed, when such a ceramic honeycomb filter 11 is used as a particulates-capturing filter, are (a) an alternate regeneration method using a pair of ceramic honeycomb filters, in which one filter is used while the other filter is regenerated, (b) a-continuous regeneration method, in which particulates are burned by the action of a catalyst while capturing particulates, to regenerate the filter, etc.

Important to such a particulates-capturing filter are a pressure loss, particulates-capturing efficiency, and particulates-capturable time, a time period from the start of capturing particulates to a point at which a pressure loss reaches a predetermined level. The capturing efficiency and the pressure loss are in a contradictory relation; the higher capturing efficiency results in increase in the pressure loss, while decrease in the pressure loss results in the reduction of the capturing efficiency. To satisfy these contradictory properties of the filter, it was conventionally investigated to control the porosity and average pore diameter of the porous partition walls of the ceramic honeycomb filter. It is further necessary that particulates captured by the ceramic honeycomb filter can be burned at high efficiency, and that the ceramic honeycomb filter is not broken by thermal stress generated by the burning of particulates. Thus, investigation has been conducted to meet these requirements.

Under such circumstances, JP 3-10365 B discloses a filter for cleaning an exhaust gas with little pressure loss, the filter having partition walls whose pores are composed of small pores having a pore diameter of 5–40 μm and large pores having a pore diameter of 40–100 μm, the number of the small pores being 5–40 times that of the large pores, whereby high capturing efficiency can be maintained from the start. In this filter, pores in the partition walls preferably have an average pore diameter of more than 15 μm, and the cumulative pore volume of the pores is preferably within a range of 0.3–0.7 $cm^3/g$. Though JP 3-10365 B does not describe the porosity P (volume %) of the partition walls, assuming that cordierite used in Examples has a density p of 2.5 $g/cm^3$, the porosity P of the partition walls can be calculated from the cumulative pore volume V ($cm^3/g$) by the following formula:

$$P(\%)=100\ V\rho/(11+V\rho).$$

According to the above formula, a preferred range (0.3–0.7 $cm^3/g$) of the cumulative pore volume of pores in the partition walls is converted to a porosity of 42.8–63.6% by volume.

JP 61-54750 B discloses that by adjusting an open porosity and an average pore diameter, it is possible to design a filter from a high-capturing rate to a low-capturing rate. JP 61-54750 B provides a preferred specific example of the open porosity and the average pore diameter in a region defined by points 1, 5, 6 and 4 in FIG. 8. The open porosity and the average pore diameter of each point are as shown below.

| Point | Open Porosity (volume %) | Average Pore Diameter (μm) |
|---|---|---|
| 1 | 58.5 | 1 |
| 5 | 39.5 | 15 |
| 6 | 62.0 | 15 |
| 4 | 90.0 | 1 |

JP 9-77573 A discloses a honeycomb structure having a high capturing rate, a low pressure loss and a low thermal expansion ratio, which has a porosity of 55–80% and an average pore diameter of 2540 μm, pores in its partition walls being composed of small pores having pore diameters of 5–40 μm and large pores having pore diameters of 40–100 μm and the number of small pores being 5–40 times that of large pores.

Though a good balance between the pressure loss and the particulates-capturing efficiency of a filter can be achieved to some extent by optimizing the porosity and the average pore diameter of a ceramic honeycomb structure and the pore diameters of its partition walls, however, increase in the porosity and the average pore diameter inevitably results in decrease in the strength of the porous partition walls of the filter. The reason therefor is that the strength of the porous partition walls is in a contradictory relation with the porosity and the average pore diameter of the porous partition walls. Particularly when the porosity is increased to 60% or more, or the average pore diameter is increased to 15 μm or more to provide a filter with a low pressure loss, there is remarkable decrease in the strength of the porous partition walls. Accordingly, it has been impossible to obtain ceramic honeycomb filters having low pressure loss and high capturing efficiency as well as high durability, which are not broken by thermal stress and shock generated when used as particulates-capturing filters for diesel engines, or by mechanical stress generated by fastening in assembling and vibration, etc.

At the time of regenerating a conventional honeycomb filter in which particulates are captured, because an exhaust gas passes through flow paths adjacent to an outer peripheral wall 11*a* as shown in FIG. 3, heat generated by the combustion of the captured particulates dissipates to a metal housing via the outer peripheral wall 11*a* and holding members 13*a*, 13*b*. Accordingly, there is a large temperature gradient between a center portion of the filter 11 and an outer periphery portion, resulting in the problems that the filter is cracked by thermal stress, and that particulates are insufficiently burned because there is no enough temperature increase in the outer periphery portion.

Further, because sealers on the exhaust-gas-entering side have flat outer end surfaces in conventional ceramic honeycomb filters as shown in FIGS. 2 and 3, particulates are accumulated on the outer end surfaces of sealers on the exhaust-gas-entering side. In addition, because particulates extremely strongly tend to be aggregated, the accumulation of particulates gradually grows. When there is a large accumulation of particulates, flow paths are clogged on the exhaust-gas-entering side, resulting in increase in the pressure loss of the filter. As a result, the particulates-capturable time becomes shorter, thereby making it necessary to regenerate the filter frequently.

OBJECTS OF THE INVENTION

Accordingly, an object of the present invention is to provide a ceramic honeycomb filter having excellent mechanical strength and durability as well as low pressure loss, which ensures a long particulates-capturable time.

DISCLOSURE OF THE INVENTION

As the result of intensive research in view of the above object, the inventors have found that by providing a ceramic honeycomb structure with porous partition walls having a pore diameter distribution in a predetermined range, and by improving a sealing method, it is possible to obtain a ceramic honeycomb filter having low pressure loss, high capturing efficiency and high strength together with excellent regeneration efficiency and long particulates-capturable time. The present invention has been completed based on this finding.

Thus, the ceramic honeycomb filter of the present invention comprises a ceramic honeycomb structure having porous partition walls defining a plurality of flow paths for flowing an exhaust gas through the porous partition walls to remove particulates from the exhaust gas, the predetermined flow paths among the flow paths being sealed at their ends, the porous partition walls having a porosity of 60–75% and an average pore diameter of 15–25 $\mu$m when measured according to a mercury penetration method, and the maximum of a slope $S_n$ of a cumulative pore volume curve of the porous partition walls relative to a pore diameter obtained at an n-th measurement point being 0.7 or more, the $S_n$ being represented by the following formula (1):

$$S_n=-(V_n-V_{n-1})/[\log D_n-\log (D_{n-1})] \quad (1),$$

wherein $D_n$ is a pore diameter ($\mu$m) at an n-th measurement point, $D_{n-1}$ is a pore diameter ($\mu$m) at an (n−1)-th measurement point, $V_n$ is a cumulative pore volume (cm$^3$/g) at an n-th measurement point, and $V_{n-1}$ is a cumulative pore volume (cm$^3$/g) at an (n−1)-th measurement point.

The ceramic honeycomb filter preferably has the maximum $S_n$ of 0.9 or more. The ceramic honeycomb filter preferably has a porosity of 65–70%. The ceramic honeycomb filter preferably has an average pore diameter of 18–22 $\mu$m.

A porous ceramic forming the ceramic honeycomb structure preferably has a main component chemical composition substantially comprising 42–56% by mass of $SiO_2$, 30–45% by mass of $Al_2O_3$, and 12–16% by mass of MgO, the main component of its crystal phase being cordierite.

FIG. 15' is a graph showing the relation between the cumulative pore volume and pore diameter obtained by eleven measurements at pore diameters of from 1 $\mu$m to 140 $\mu$m in Example D2 of U.S. Pat. No. 6,541,407 to Beau et al.

It is preferable that the flow paths near its outer peripheral wall are preferably sealed by sealers at both ends, that the length of the sealers from a filter end surface is 8.2% or less of the total length of the filter, and that the flow paths having both ends sealed exist within a range of a radial length corresponding to 5 times the partition wall pitch at maximum from the outer periphery toward the center of the filter. To seal the ends of the flow paths by sealers, the honeycomb structure is immersed in a sealer slurry to a predetermined depth with the predetermined openings of the honeycomb structure at an end covered by a resin mask, and the resin mask is removed after drying the slurry, followed by sintering of the sealers.

It is preferable that a pitch of the porous partition walls is 2.54 mm or less, and that at least some of the sealers sealing flow paths except for those near its outer periphery wall project from the end surfaces of the partition walls by 0.01–5 mm in a flow path direction.

The ceramic honeycomb filter of the present invention comprises a ceramic honeycomb structure having porous partition walls defining a plurality of flow paths for flowing an exhaust gas through the porous partition walls to remove particulates from the exhaust gas, the predetermined flow paths among the flow paths being sealed at their ends, a catalyst being carried by the porous partition walls, the porous partition walls having a porosity of 60–75% and an average pore diameter of 15–25 $\mu$m when measured according to a mercury penetration method, and the maximum of a slope $S_n$ of a cumulative pore volume curve of the porous partition walls relative to a pore diameter obtained at an n-th measurement point being 0.7 or more, the $S_n$ being represented by the following formula (1):

$$S_n=-(V_n-V_{n-1})/[\log D_n-\log (D_{n-1})] \quad (1),$$

wherein $D_n$ is a pore diameter (gm) at an n-th measurement point, $D_{n-1}$ is a pore diameter ($\mu$m) at an (n−1)-th measurement point, $V_n$ is a cumulative pore volume (cm$^3$/g) at an n-th measurement point, and $V_{n-1}$ is a cumulative pore volume (cm$^3$/g) at an (n−1)th measurement point.

The partition walls of the honeycomb structure having the above structure have a high porosity and a sharp pore diameter distribution, with a high percentage of pores near its average pore diameter. Accordingly, the ceramic honeycomb filter of the present invention is low in pressure loss and high in strength.

BRIEF DESCRIPTION OF THE DRAWINGS

FIG. 1(*b*) is a partially cross-sectional side view showing the honeycomb structure of FIG. 1(*a*);

FIG. 2(*b*) is a partially cross-sectional side view showing the filter of FIG. 2(*a*);

FIG. 7(*b*) is an enlarged cross-sectional view showing another example of the sealing of a conventional ceramic honeycomb filter;

FIG. 7(*c*) is an enlarged cross-sectional view showing a further example of the sealing of a conventional ceramic honeycomb filter;

FIG. 8(*b*) is an enlarged cross-sectional view showing another example of the sealing of the ceramic honeycomb filter of the present invention;

FIG. 10(*b*) is a schematic cross-sectional view showing a state in which the resin mask is removed from the ceramic honeycomb filter after sealing it;

FIG. 11(*b*) is an enlarged cross-sectional view showing the sealing of the ceramic honeycomb filter of Reference Example 11;

FIG. 14(*b*) is a partially cross-sectional side view showing a still further example of the ceramic honeycomb filter of the present invention;

FIG. 14(*c*) is a partially cross-sectional side view showing a still further example of the ceramic honeycomb filter of the present invention;

FIG. 14(*d*) is a partially cross-sectional side view showing a still further example of the ceramic honeycomb filter of the present invention;

DESCRIPTION OF THE PREFERRED EMBODIMENTS

In the present invention, with respect to the cumulative pore volume curve (curve shown in a graph having an axis of abscissas representing a pore diameter and an axis of ordinates representing a cumulative pore volume) of the partition walls of the ceramic honeycomb structure, the maximum of a slope $S_n$ of the cumulative pore volume curve relative to a pore diameter obtained at the n-th measurement point should be 0.7 or more, the $S_n$ being represented by the following formula (1):

$$S_n=-(V_n-V_{n-1})/[\log D_n-\log (D_{n-1})] \quad (1),$$

wherein $D_n$ is a pore diameter (μm) at an n-th measurement point, $D_{n-1}$ is a pore diameter (μm) at an (n−1)-th measurement point, $V_n$ is a cumulative pore volume (cm$^3$/g) at an n-th measurement point, and $V_{n-1}$ is a cumulative pore volume (cm$^3$/g) at an (n−1)-th measurement point.

The reasons therefor are as follows: The strength of the ceramic honeycomb structure depends not only on a porosity and an average pore diameter, but also on a pore diameter distribution. It has been found that by making the pore diameter distribution sharp (by improving the uniformity of pore sizes), it is possible to obtain a ceramic honeycomb structure with high strength, even though its porosity is 60% or more, and its average pore diameter is 15 μm or more.

The ceramic honeycomb structure is measured by a mercury penetration method using Autopore III9410 available from Micromeritics with respect to a porosity, an average pore diameter and a slope $S_n$ of a cumulative pore volume curve.

Figure 15:
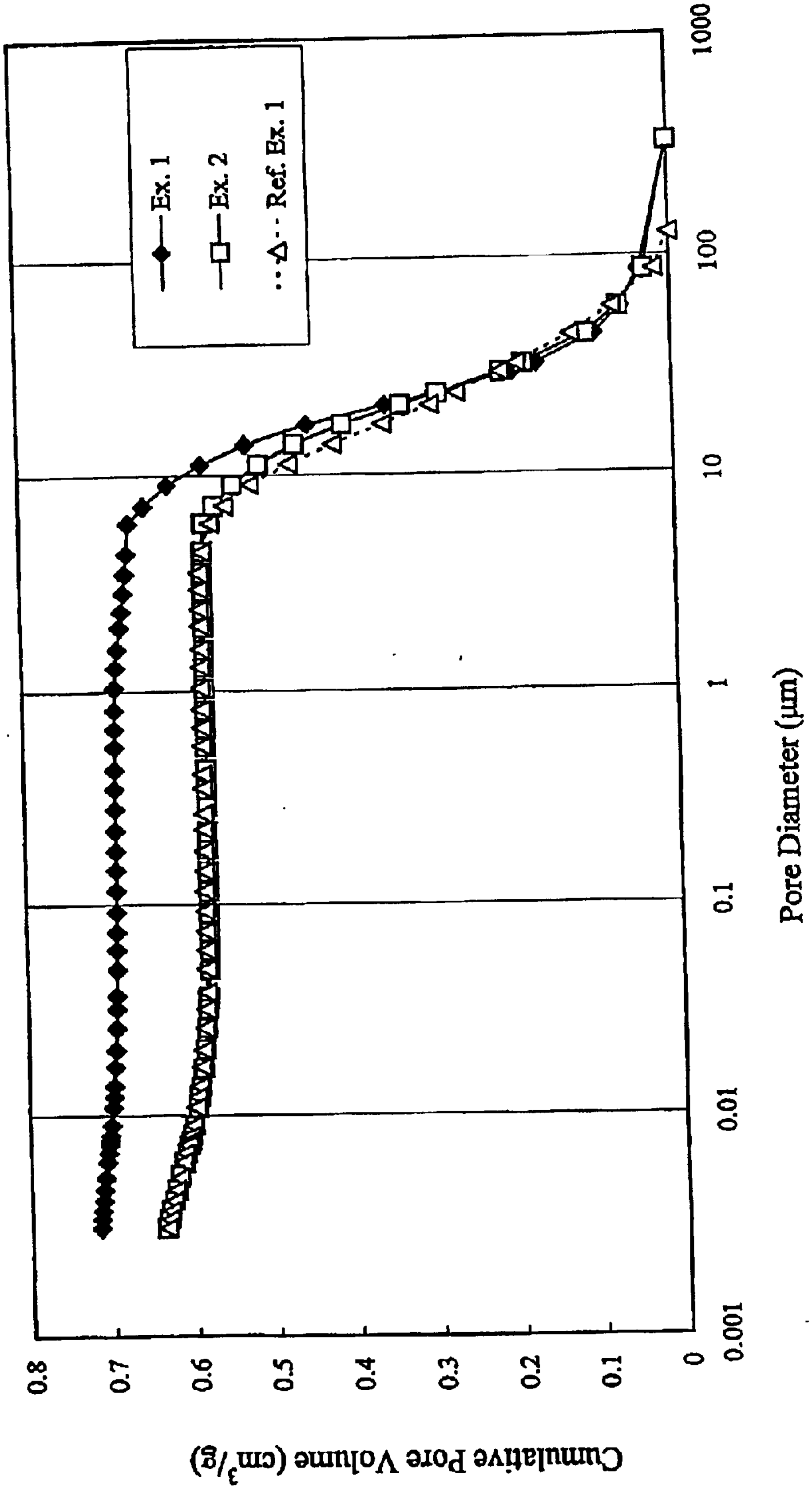
FIG. 15 is a graph showing the relation between cumulative pore volume and a set value of mercury pressure in the honeycomb structures obtained in Examples 1 and 2 and Reference Example 1.

FIG. 15' is a graph showing the relation between cumulative pore volume find pore diameter from the prior art. In a mercury penetration method, a sample is charged into a measuring cell, and the cell is evacuated, and then mercury is introduced into the cell and pressurized, to determine the relation between a pore diameter and a cumulative pore volume from the pressure and the volume of mercury filled in the pores of the sample. Mercury penetrates into finer pores at higher pressure, malting it possible to measure the volume of fine pores corresponding to the pressure. Accordingly, measurement data are obtained from larger pore diameters to smaller pore diameters successively.

Figure 4:
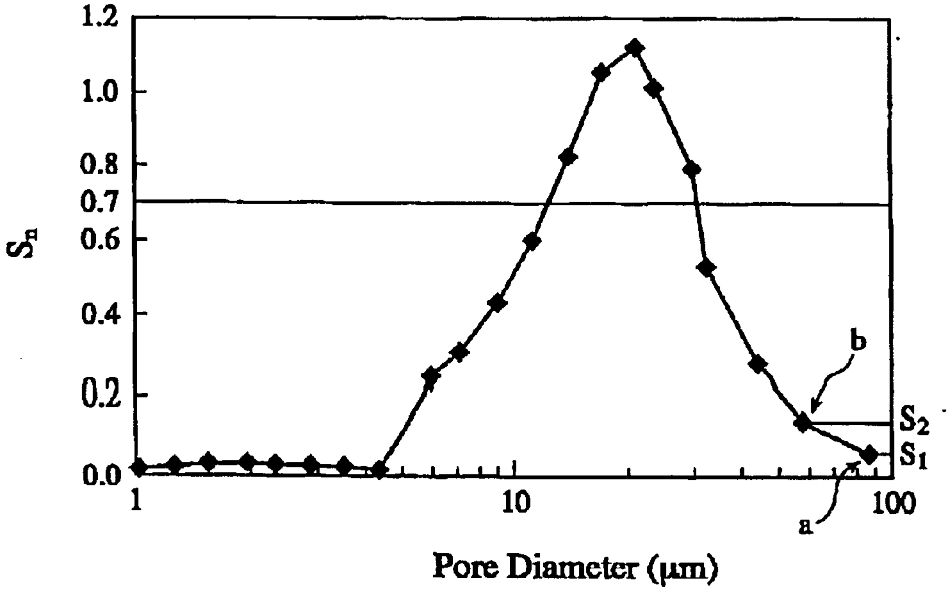
FIG. 4 is a graph showing the relation between a pore diameter determined by a mercury penetration method and a slope $S_n$ of a cumulative pore volume curve.

The slope $S_n$ at an n-th measurement point is determined by the above formula (1) from a pore diameter $d_{n-1}$ and a cumulative pore volume $V_{n-1}$ at an (n−1)-th measurement point and a pore diameter $d_n$, and a cumulative pore volume $V_n$ at an n-th measurement point from the start of measurement. One example of measurement results of $S_n$ is shown in FIG. 4. In FIG. 4, a point a represents a slope $S_1[(V_1-V_2)/(\log D_1-\log D_2)]$ determined from pore diameters $D_1$, $D_2$ and cumulative pore volumes $V_1$, $V_2$ at the first and second measurement points, and a point b represents a slope $S_2[(V_2-V_3)/(\log D_2-\log D_3)]$ determined from pore diameters $D_2$, $D_3$ and cumulative pore volumes $V_2$, $V_3$ at the second and third measurement points. A distribution of a slope $S_n$ in a cumulative pore volume curve shown in FIG. 4 indicates that when the maximum of $S_n$ is less than 0.7, the pore diameter distribution is broad, and that when the maximum of $S_n$ is 0.7 or more, the pore diameter distribution is extremely narrow.

When the pore diameter distribution is broad, there are a large percentage of large pores causing decrease in strength, and a large percentage of fine pores causing the clogging of pores by particulates, resulting in increase in pressure loss. Accordingly, it is difficult to satisfy both requirements of low pressure loss and high strength. On the other hand, when the maximum of $S_n$ is 0.7 or more, the pore diameter distribution is extremely narrow, resulting in decreased percentages of large pores and fine pores, thereby satisfying both requirements of low pressure loss and high strength.

Figure 5:
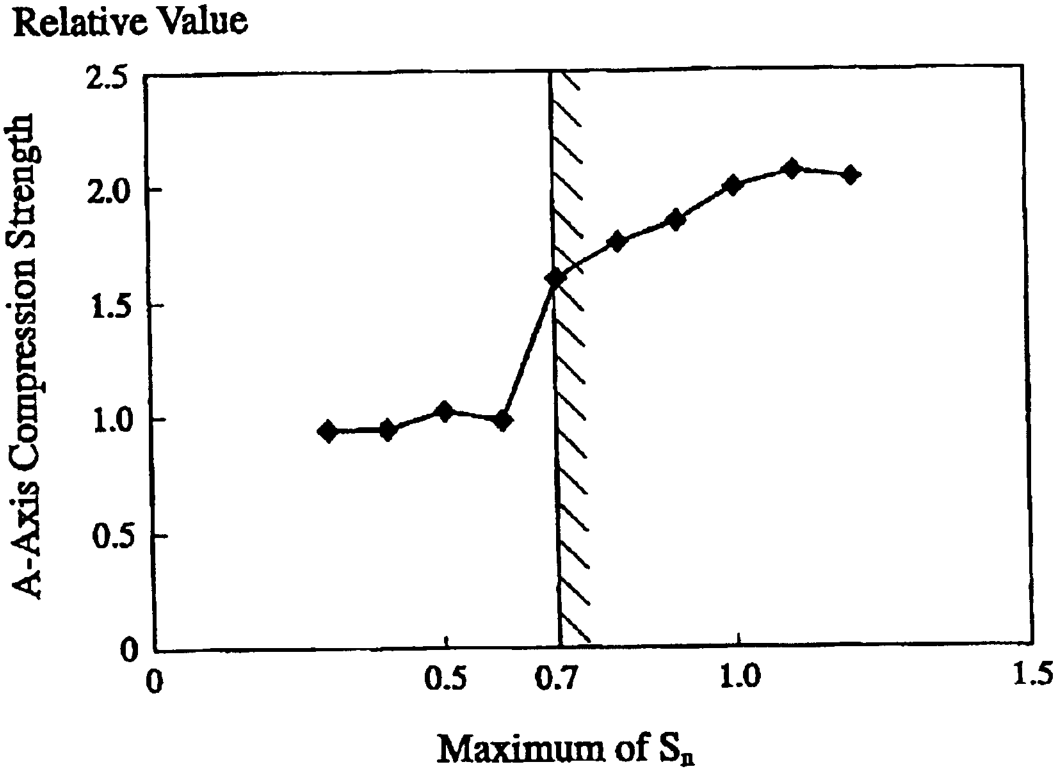
FIG. 5 is a graph showing the relation between the maximum of the slope $S_n$ of the cumulative pore volume curve and an A-axis compression strength.

This is clear from FIG. 5 showing the relation between the maximum of a slope $S_n$ of a cumulative pore volume curve and a relative value of an A-axis compression strength. It is clear from FIG. 5 that when the maximum of $S_n$ becomes 0.7 or more, the A-axis compression strength reaches 1.5 times or more a conventional level (for instance, a region in which the maximum of a slope $S_n$ is 0.6 or less). That is, it is evident that when the maximum of $S_n$ becomes 0.7 or more, the mechanical strength of the ceramic honeycomb structure is extremely improved. To satisfy both requirements of low pressure loss and high strength, the maximum of $S_n$ is preferably 0.9 or more.

The porosity of the ceramic honeycomb structure is 60–75%. When the porosity is less than 60%, the filter has too high pressure loss. On the other hand, when it exceeds 75%, the filter has reduced strength, resulting in decrease in the efficiency of capturing particulates. When the porosity is 65% or more, the pressure loss of the filter occurs. When the porosity is 70% or less, the strength and particulates-capturing efficiency of the filter suffers from only smaller decrease. Accordingly, the porosity is preferably in a range of 65–70%.

The pores existing in the ceramic honeycomb structure have an average pore diameter of 15–25 μm. When the average pore diameter is less than 15 μm, the filter suffers from too large pressure loss. On the other hand, when the average pore diameter exceeds 25 μm, the strength of the filter decreases, failing to capture extremely fine particles and thus resulting in decrease in particulates-capturing efficiency. To satisfy the requirements of contradictory properties of low pressure loss and high strength, the preferred range of the average pore diameter is 18–22 μm.

A porous ceramic constituting the ceramic honeycomb structure preferably has a main component chemical composition substantially comprising 42–56% by mass of $SiO_2$, 30–45% by mass of $Al_2O_3$ and 12–16% by mass of MgO, the main component of its crystal phase being cordierite. The ceramic honeycomb filter of the present invention is resistant to cracks even with thermal shock because of low thermal expansion inherent in cordierite. However, the present invention is not restricted to cordierite, and other heat-resistant ceramics such as mullite, alumina, silicon nitride, silicon carbide, aluminum nitride, lithium aluminum silicate, aluminum titanate, zirconia, etc. may be used.

To efficiently bum particulates at the time of regenerating the filter, the following is preferable: (a) both ends of the flow paths near the outer peripheral wall of the filter are sealed by sealers; (b) the length of the sealers from a filter end surface is 8.2% or less of the total length of the filter; and (c) flow paths having both ends sealed exist within a range of a radial length corresponding to 5 times the partition wall pitch at maximum from the outer periphery toward the center of the filter. The reason therefor is that because an exhaust gas does not flow through flow paths having both ends sealed, the sealed flow paths serve as an adiabatic air layer, resulting in suppressing heat dissipation from the outer peripheral wall of the filter to the metal housing, which enables efficient burning of the captured particulates. Further, with flow paths having both ends sealed, it is possible to minimize the pressure loss of the filter, thereby avoiding decrease in engine performance.

With the length of sealers sealing both ends of the flow paths from a filter end surface adjusted to 8.2% or less of the total length of the filter, it is possible to suppress the dissipation of combustion heat of particulates to the metal housing via sealers to a negligible extent. When the length of sealers from a filter end surface exceeds 8.2% of the total length of the filter, the dissipation of combustion heat of particulates to metal housing exceeds a negligible level, whereby the captured particulates cannot be burned completely, resulting in decrease in the regeneration ratio of the filter.

Because the flow paths having both ends sealed exist within a range of a radial length corresponding to 5 times the partition wall pitch at maximum from the outer periphery toward the center of the filter, the pressure loss of the filter can be minimized. When the flow paths having both ends sealed exceeds a range of a radial length corresponding to 5 times the partition wall pitch at maximum from the outer periphery toward the center of the filter, the percentage of partition walls having a filter function becomes relatively small, resulting in increase in the pressure loss of the filter.

The length of sealers sealing both ends of the flow paths from a filter end surface near the outer peripheral wall of the filter is preferably 3.3% or less of the total length of the filter. With this length, the flow paths near the outer periphery wall of the filter exhibit a larger effect of serving as adiabatic air layer, resulting in further decrease in the dissipation of heat from the outer peripheral wall of the filter to the metal housing. As a result, it is possible to burn the captured particulates more efficiently, resulting in further improvement in the regeneration ratio of the filter.

With the flow paths having both ends sealed near its outer peripheral wall existing within a range of three times the partition wall pitch at maximum from the outer periphery toward the center of the filter, the pressure loss of the filter can be further decreased. As a result, the back pressure of an engine decreases, resulting in further increase in engine performance.

Figure 7A:
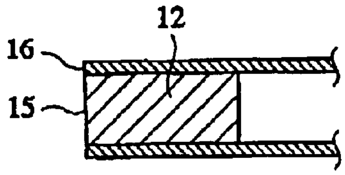
FIG. 7(*a*) is an enlarged cross-sectional view showing one example of the sealing of a conventional ceramic honeycomb filter.
Figure 7B:
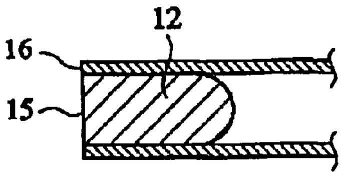
Figure 7C:
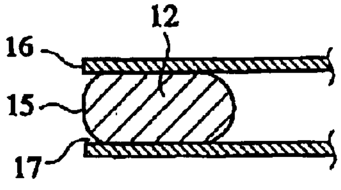

In the ceramic honeycomb filter of the present invention, the pitch of the partition walls is preferably 2.54 mm or less, and at least some of the sealers for sealing flow paths except for those near the outer peripheral wall preferably project from the end surfaces of the partition walls by 0.01–5 mm. On the other hand, as shown in FIGS. 7(*a*)–(*c*), a conventional sealer 12 has an outer end surface 15 existing on the same plane as that of an outer end surface 16 of each partition wall.

Figure 8A:
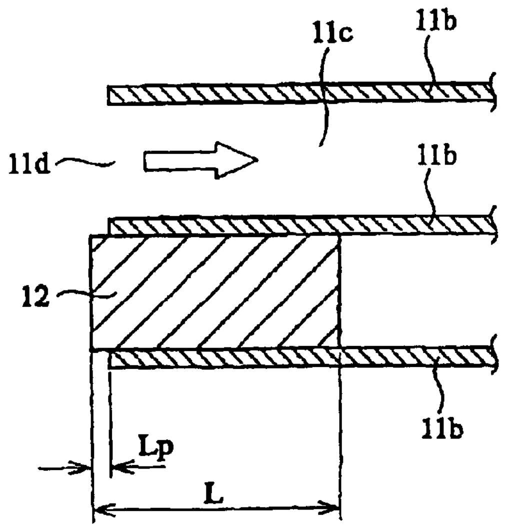
FIG. 8(*a*) is an enlarged cross-sectional view showing one example of the sealing of the ceramic honeycomb filter of the present invention.
Figure 8B:
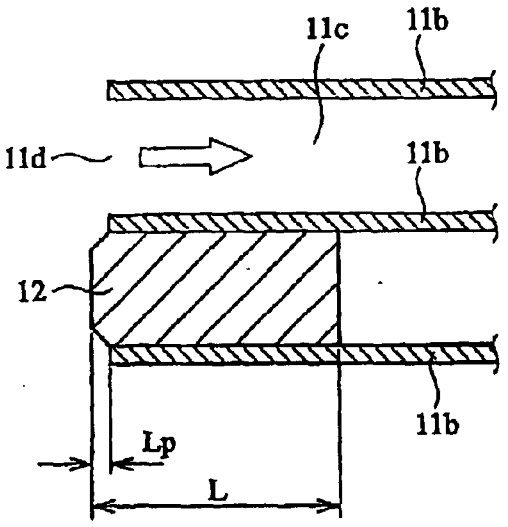

As shown in FIGS. 8(*a*) and (*b*), because the substantial opening ratio of the exhaust-gas-entering ends 11*d* of the flow paths 11*e* is made larger by the projecting portions of sealers 12, the flow paths 11*c* have smaller resistance to the exhaust gas, enabling the exhaust gas to smoothly flow in a flow path direction. As a result, particulates are less likely accumulated on the outer end surfaces of the sealers 12, thereby preventing the pressure loss from increasing by narrowing flow path inlets, and thus providing a ceramic honeycomb filter with long particulates-capturable time. Incidentally, because flow paths near the outer periphery wall are sealed at both ends, and because holding members 13*a*, 13*b* are positioned to clog the flow paths, it is not necessary that the sealers 12 are projecting from the end surfaces of the partition walls.

The projecting portion of a sealer 12 has such a shape as shown, for instance, in FIG. 8. The projection length $L_P$ of the sealers 12 is preferably 0.01–5 mm. When the projection length $L_P$ of the sealers 12 is less than 0.01 mm, there is insufficient effect of increasing the opening ratio of the flow paths 11*c* at the exhaust-gas-entering ends 11*d*, making it likely for the pressure loss to increase by the narrowing of flow path inlets due to accumulation of particulates on the outer end surfaces of the sealers 12. On the other hand, when the projection length $L_P$ exceeds 5 mm, a mechanical load applied to the sealers 12 generates a large bending moment of the sealers 12 to the partition wall ends. Accordingly, the projecting portions of the sealers 12 are likely to be broken, for instance, at a time when the filter 11 is inserted into the metal housing 14.

When the projection length $L_P$ of sealers 12 is made 0.1 mm or more, the resistance of the sealers 12 to an exhaust gas flow becomes smaller. On the other hand, when the projection length $L_P$ of sealers 12 is made 2 mm or less, the projecting portions of the sealers 12 becomes less-likely broken. Accordingly, a preferred range of the projection length $L_P$ of sealers 12 is 0.1–2 mm.

As shown in FIG. 8(*b*), each sealer 12 preferably has a radial cross section that decreases as projecting from the end surface of the partition wall. By tapering the projecting portion of each sealer 12, the resistance of the sealer 12 to an exhaust gas flow becomes smaller.

The outer end surfaces of sealers 12 preferably do not retreat from the end surfaces of the partition walls. Even if the sealers 12 project from the end surfaces of the partition walls, gaps 17 as shown in FIG. 7(*c*) help the accumulation of particulates therein, making it likely to increase the pressure loss by narrowing the flow path inlets.

The length L of sealers 12 is preferably 3–20 mm. When the length L of sealers 12 is less than 3 mm, there are too small contact areas between the sealers 12 and the partition walls 11*d*, failing to ensure sufficient adhesion therebetween. On the other hand, when L exceeds 20 mm, the filter 11 has a decreased effective cross section.

The outer surface of each sealer 12 preferably has a surface roughness (maximum height Ry) of 200 μm or less. When the maximum height Ry exceeds 200 μm, particulates are likely to be adhered to and accumulated on the outer surfaces of sealers 12, resulting in increase in pressure loss by narrowing the flow path inlets.

The partition walls 11*b* of the honeycomb structure carrying a catalyst has a porosity of 60–75% and an average pore diameter of 15–25 μm when measured according to a mercury penetration method, the maximum of a slope $S_n$ of a cumulative pore volume curve of partition walls 11*b* relative to a pore diameter obtained at an n-th measurement point being 0.7 or more, the $S_n$ being represented by the following formula (1):

$$S_n=-(V_n-V_{n-1})/[\log D_n-\log (D_{n-1})] \quad (1),$$

wherein $D_n$ is a pore diameter (μm) at an n-th measurement point, $D_{n-1}$ is a pore diameter (μm) at an (n−1)-th measurement point, $V_n$ is a cumulative pore volume ($cm^3/g$) at an n-th measurement point, and $V_{n-1}$ is a cumulative pore volume ($cm^3/g$) at an (n−1)-th measurement point.

With this condition met, it is possible to achieve low pressure loss, high capturing efficiency and high strength in the ceramic honeycomb structure.

The ceramic honeycomb structure of the present invention can be produced as follows: First, the ceramic material powder is mixed with a pore-forming material having an average particle diameter of 20 μm or more, particularly 40–80 μm, and such a particle diameter distribution that a particle diameter range of 20–100 μm occupies 50% or more of the total particles in such a range that porosity after sintering is 60–75%. This mixture is mixed with a molding aid such as a binder, a lubricant, etc., if necessary, and then mixed with water to form a plasticizable batch. This batch is extrusion-molded to a honeycomb structure, and dried. Thereafter, the pore-forming material is removed by burning. Next, the green body is sintered to obtain a honeycomb structure having fine pores inherent in ceramics and small pores formed by removing the pore-forming material in the partition walls. Thus, by combining fine pores inherent in ceramics and small pores formed by a pore-forming material having a uniform particle diameter (average particle diameter: 20 μm or more, and percentage of particle diameter of 20–100 μm: 50% or more), it is possible to provide the partition walls with an average pore diameter in a range of 15–25 μm, and make the maximum of $S_n$, which indicates the sharpness of a particle diameter distribution, 0.7 or more. Particularly because cordierite ceramics inherently have pore diameters of about 1–20 μm, it is effective to combine the cordierite ceramics with a pore-forming material having an average particle diameter of 20 μm or more with a percentage of particle diameters of 20–100 μm occupying 50% or more of the total.

It is preferable that the pore-forming material is graphite, wheat powder, resin powder, etc., which is classified to have an average particle diameter of 20 μm or more and such a particle diameter distribution that a particle diameter of 20–100 μm occupies 50% or more of the total powder. Also, when resin powder is used, its production conditions may be controlled to have an average particle diameter of 20 μm or more and such a particle diameter distribution that a particle diameter of 20–100 μm occupies 50% or more of the total powder.

The pore-forming material is substantially spherical, pores formed in the partition walls are also spherical, resulting in decrease in stress concentration in the pores. Therefore, the use of a spherical pore-forming material can provide a honeycomb structure with excellent mechanical strength. Further, when the pore-forming material is hollow, it is easy to burn the pore-forming material away, avoiding the cracking of the partition walls at the time of burning the pore-forming material, which leads to improvement in a production yield.

The present invention will be explained in detail referring to Examples below without intention of restricting the present invention thereto.

EXAMPLES 1 AND 2, REFERENCE EXAMPLE 1

To form cordierite having a main component composition comprising 49–51% by mass of $SiO_2$, 35–37% by mass of $Al_2O_3$ and 13–15% by mass of MgO, kaolin powder, calcined kaolin powder, alumina powder, aluminum hydroxide powder, silica powder and talc powder were mixed together with a binder, a lubricant and spherical resin powder as a pore-forming material in predetermined amounts. The resultant mixture was mixed with water to form a plasticizable batch. This batch was extrusion-molded to a cylindrical honeycomb shape, and dried.

Figure 16:
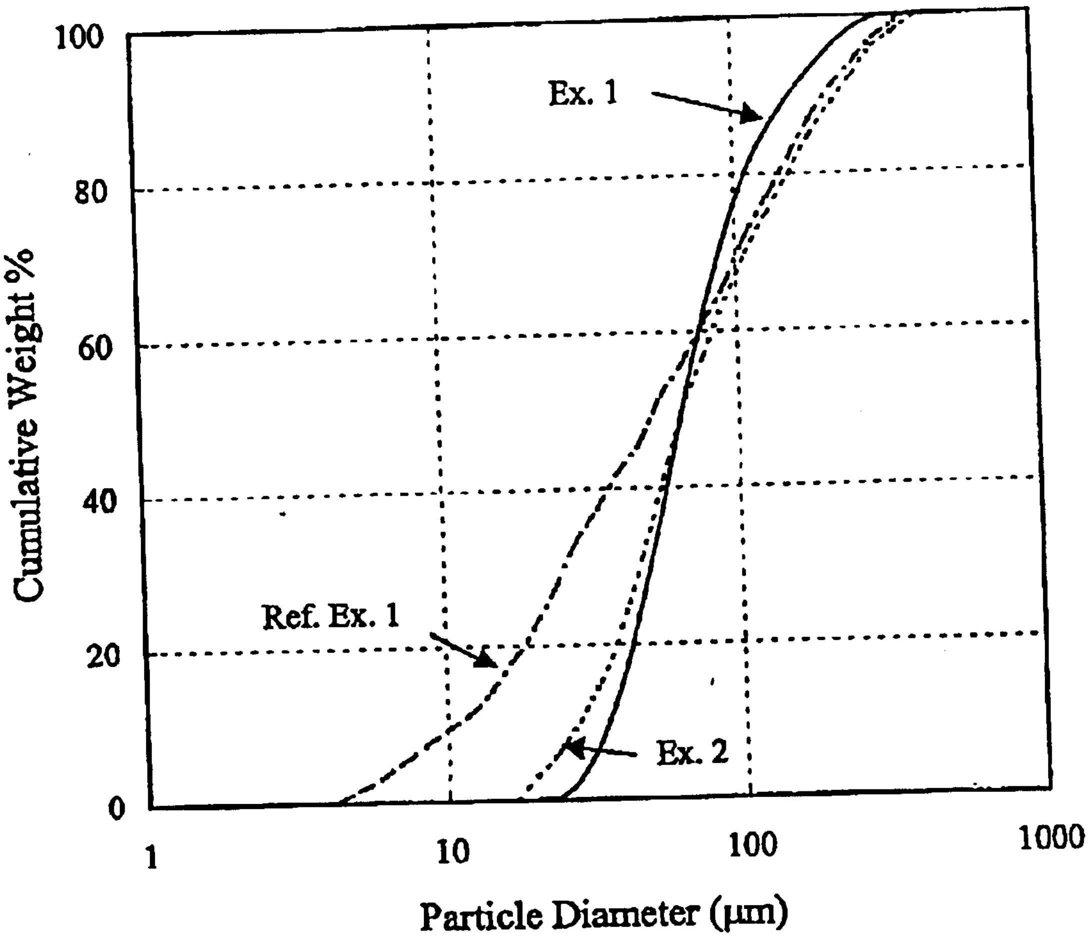
FIG. 16 is a graph showing the particle diameter distributions of pore-forming materials.

The particle diameter distribution of the spherical resin powder used as the pore-forming material is shown in FIG. 16. The average particle diameter and the percentage of particle diameter in 20–100 μm of the spherical resin powder are shown in Table below.

| Pore-Forming Material | Average Particle Diameter (μm) | Percentage of Particle Diameter in 20–100 μm (% by mass) |
|---|---|---|
| Example 1 | 64 | 75 |
| Example 2 | 62 | 62 |
| Ref. Ex. 1 | 52 | 48 |

Figure 1A:
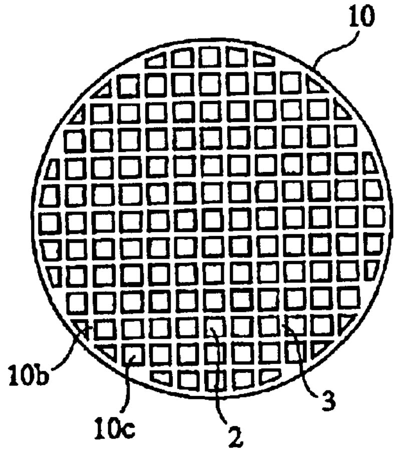
FIG. 1(*a*) is a front view showing one example of a honeycomb structure.
Figure 1B:
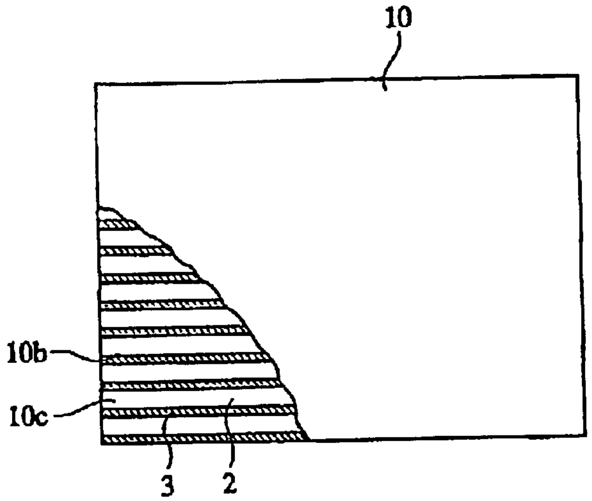

The resultant green body was sintered at a temperature of 1350–1440° C. to obtain various types of cordierite honeycomb structures 10 each comprising porous ceramic partition walls 3 and penetrating pores 2 for flow paths as shown in FIG. 1. Each of the resultant honeycomb structures 10 had a diameter of 143 mm and a length of 152 mm with partition wall thickness of 0.3 mm, and the number of flow paths per 1 cm² was 46.

By adjusting the particle size and formulation of ceramic material powders, the particle size and amount of the pore-forming material, molding conditions, sintering conditions, etc., the honeycomb structures of Examples 1 and 2 and Reference Example 1 were produced. The pore diameter of each honeycomb structure was measured by a mercury penetration method using Autopore III9410 available from Micromeritics. FIG. 15 shows the relation between a cumulative pore volume obtained from the pore diameter data and a set value of mercury pressure. The pore diameter and the set pressure value are in the following relation pore:

$$\text{diameter} = -4\alpha \cos\theta / P$$

wherein $\alpha$ is a surface tension of mercury, $\theta$ is a contact angle of mercury to a solid, and $P$ is a set value of mercury pressure.

Because $4\alpha \cos\theta$ is constant, the pore diameter is inversely proportional to the set pressure. Also, the cumulative pore volume is the volume of mercury penetrating into pores under pressure/the weight of a sample. As is clear from FIG. 15, the slope of the cumulative pore volume curve of a sample of Example 1 is extremely steep in a range between about 10 μm and about 100 μm, and the slope of the cumulative pore volume curve of a sample of Example 2 is also steep, while the slope of the cumulative pore volume curve of a sample of Reference Example 1 is relatively gentle.

Figure 6:
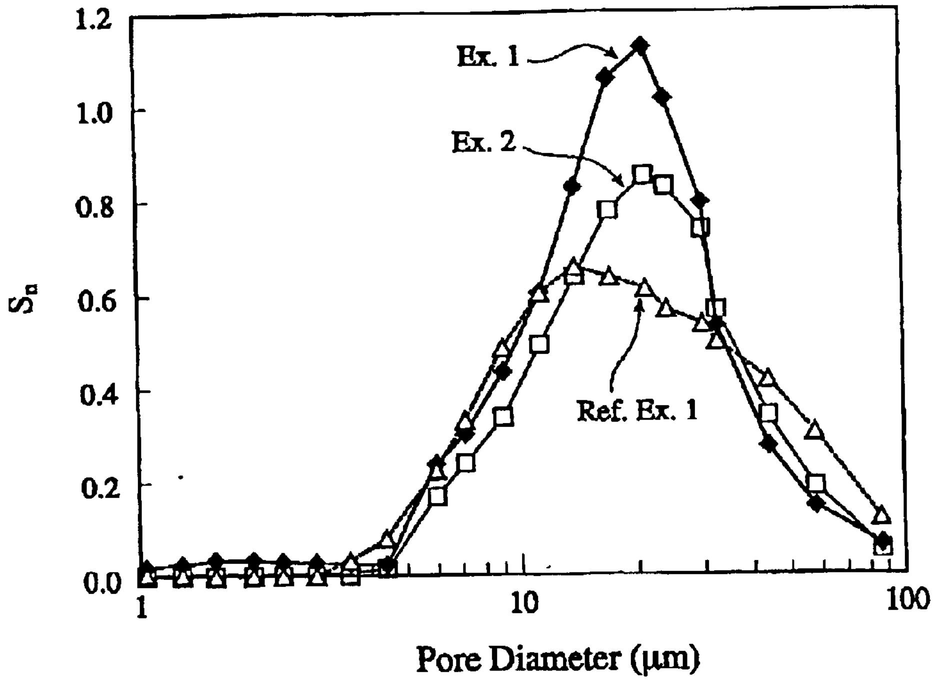
FIG. 6 is a graph showing the relation between a pore diameter and a slope $S_n$ of a cumulative pore volume curve in the honeycomb structures of Examples 1 and 2 and Reference Example 1.

In the same manner as above, each sample was measured with respect to a porosity, an average pore diameter, and the maximum slope $S_n$ of a cumulative pore volume curve. The slope $S_n$ of the cumulative pore volume curve should be determined on a smooth curve depicted based on plots of measured data from the difference in a cumulative pore volume between two points at an equal small interval of a pore diameter. However, because the curve is fully smooth, and the measured points have a substantially equal interval relative to the logarithm of the pore diameter as is clear from FIG. 15, there is no substantial error even if the slope $S_n$ is determined from the data of a pore diameter at an n-th measurement point and an (n−1)-th measurement point. The results thus obtained are shown in Table 1. The relation between the pore diameter of partition walls of each honeycomb structure and the slope $S_n$ of the cumulative pore volume curve is shown in FIG. 6.

Figure 2A:
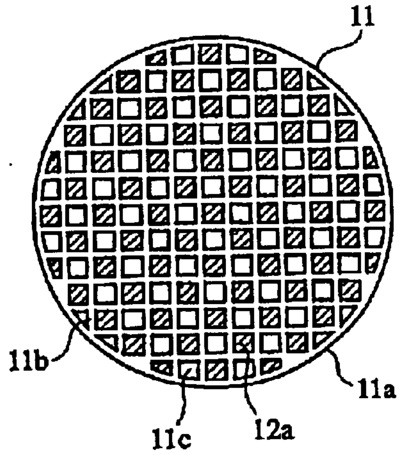
FIG. 2(*a*) is a front view showing one example of a filter comprising a honeycomb structure.
Figure 2B:
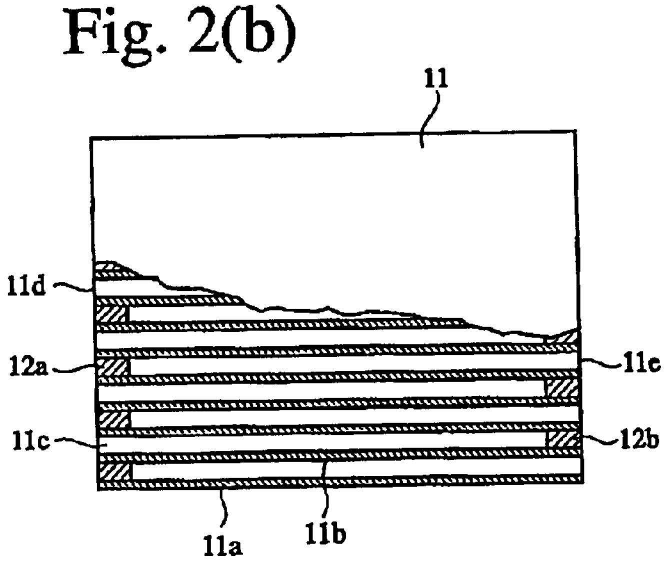
Figure 3:
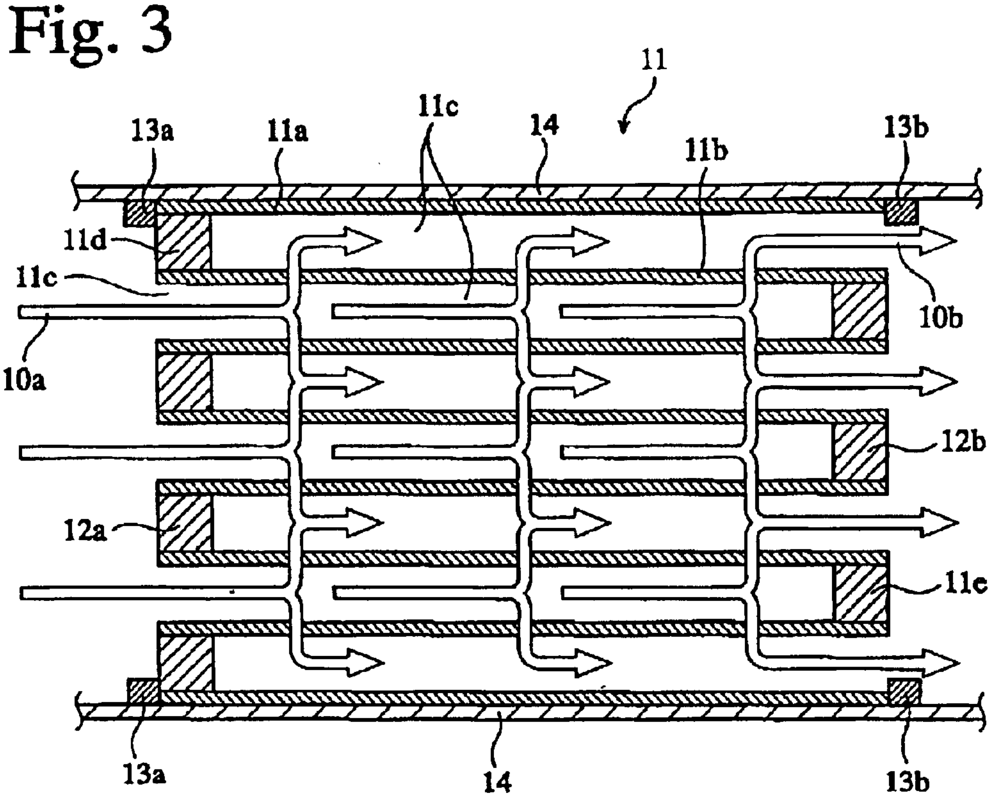
FIG. 3 is a schematic cross-sectional view showing a ceramic honeycomb filter through which an exhaust gas flows.

Flow path openings of each honeycomb structure at both ends were sealed by sealers 12a, 12b as shown in FIGS. 2(a), (b), to obtain a porous cordierite honeycomb filter 11. The pressure loss and fracture resistance of each filter 11 were evaluated. The results are shown in Table 1.

The pressure loss was measured by causing a predetermined flow rate of air to flow through each porous ceramic honeycomb filter in a pressure loss test stand, and evaluated according to the following standards:

○: Pressure loss was on a practically permitted level or less (pass).

X: Pressure loss exceeded a practically permitted level (fail).

With respect to the fracture resistance, the A-axis compression strength of each filter was measured according to the standards M505–87, "Test Method of ceramic Monolith Carriers for Exhaust-Gas-Cleaning Catalysts for Automobiles" determined by the Society of Automotive Engineers of Japan, Inc., and a relative value of the A-axis compression strength (conventional level: 1) was evaluated according to the following standards:

⊚: A-axis compression strength was 2.0 or more (pass).

○: A-axis compression strength was less than 2.0 and 1.5 or more (pass).

X: A-axis compression strength was less than 1.5 (fail).

Based on the pressure loss and the fracture resistance, the overall evaluation of the filter was carried out according to the following standards:

⊚: Pressure loss was ○, and fracture resistance was ⊚.

○: Both of pressure loss and fracture resistance were ○.

X: Any one of pressure loss and fracture resistance was "fail."

TABLE 1

| | Partition Wall | | | Filter | | |
|---|---|---|---|---|---|---|
| No. | Porosity (%) | Average Pore Diameter (μm) | Maximum of $S_n$[1] | Pressure Loss | Fracture Resistance | Overall Evaluation |
| Example 1 | 65.0 | 20.8 | 1.1 | ○ | ⊚ | ⊚ |
| Example 2 | 66.4 | 22.0 | 0.9 | ○ | ○ | ○ |
| Ref. Ex. 1 | 67.3 | 19.5 | 0.6 | ○ | × | × |

Note:
[1]Slope of a cumulative pore volume curve.

As is clear from Table 1, because the maximum of $S_n$ was 0.7 or more in Examples 1 and 2, the filters exhibited small pressure loss, their fracture resistance was "pass," and their overall evaluations were ⊚ and ○, respectively, even though the porosity was more than 60%, and the average pore diameter was 15–25 μm.

On the other hand, because the maximum of $S_n$ was less than 0.7 in the ceramic honeycomb filter of Reference Example 1, its fracture resistance was "fail" (X), and its overall evaluation was X, though its pressure loss was "pass."

EXAMPLES 3–7

The same plasticizable batch as in Example 1 was produced, and this batch was molded to a cylindrical honeycomb structure by an extrusion-molding method. The size of a molding die was adjusted to provide various partition wall thickness and various numbers of flow pats per 1 cm². Each green body was sintered at a temperature of 1350–1440° C., to obtain cordierite honeycomb structures of Examples 3–7 each having porous partition walls and penetrating pores for flow paths. Each honeycomb structure had a diameter of 143 mm and a length of 152 nm with partition wall thickness of 0.15–0.33 mm, the number of flow paths per 1 $cm^2$ being 39–62. Also, each honeycomb structure had a porosity of 65% and an average pore diameter of 20.8%, the maximum of the slope $S_n$ of its cumulative pore volume curve being 1.12.

Both ends of each filter were sealed in the same manner as in Example 1 to produce a cordierite honeycomb filter. The pressure loss and fracture resistance of each filter were measured in the same manner as in Example 1. The results are shown in Table 2. As is clear from Table 2, the overall evaluation was ○ or ⊚ in the cordierite honeycomb filters of Examples 3–7.

TABLE 2

| No. | Partition Wall: Partition Wall Thickness (mm) | Partition Wall: Number of Flow Paths (/$cm^2$) | Filter: Pressure Loss | Filter: Fracture Resistance | Overall Evaluation |
|---|---|---|---|---|---|
| Example 3 | 0.15 | 46 | ○ | ○ | ○ |
| Example 4 | 0.20 | 46 | ○ | ○ | ○ |
| Example 5 | 0.33 | 46 | ○ | ⊚ | ⊚ |
| Example 6 | 0.30 | 62 | ○ | ⊚ | ⊚ |
| Example 7 | 0.30 | 39 | ○ | ○ | ○ |

EXAMPLES 8 AND 9, REFERENCE EXAMPLE 2

As a ceramic material with a high specific surface area, activated alumina powder having a center particle size of 5 μm and alumina sol were mixed with water to form an activated alumina slurry. This slurry was wash-coated onto the same ceramic honeycomb structures as in Examples 1 and 2 and Reference Example 1. After removing an excess slurry, the coating of a slurry was repeated, and a 60 g/L of activated alumina was finally coated onto the honeycomb structure. After the honeycomb structure was dried at 120° C., it was sintered at 800° C. Further, each honeycomb structure was immersed in an aqueous chloroplatinic acid solution, dried at 120° C., and then sintered at 800° C. Ceramic honeycomb filters each carrying about 2 g/L of a platinum catalyst were thus obtained.

The ceramic honeycomb filter carrying a platinum catalyst was measured with respect to pressure loss in the same manner as in Example 1. The pressure loss after carrying the platinum catalyst was evaluated according to the same standards as in Example 1. Further, a predetermined flow rate of air containing carbon powder was caused to flow through the honeycomb filter in a pressure loss test stand, so that the filter captured the carbon powder. The pressure loss was measured before and after capturing carbon powder, to determine a pressure loss difference ΔP (pressure loss after capturing carbon powder—pressure loss before capturing carbon powder), which was evaluated according to the following standards:

○: Pressure loss difference was on a practically permitted level or less (pass).

X: Pressure loss difference exceeded a practically permitted level (fail).

These results are shown in Table 3.

TABLE 3

| No. | Pressure Loss After Carrying Catalyst | Pressure Loss Difference ΔP |
|---|---|---|
| Example 8 | ○ | ○ |
| Example 9 | ○ | ○ |
| Ref. Ex. 2 | × | × |

The ceramic honeycomb filters of Examples 8 and 9 did not substantially suffer from increase in pressure loss due to the carrying of a catalyst, and all of them were evaluated as "pass" (○) with respect to pressure loss after carrying a catalyst. On the other hand, the ceramic honeycomb filter of Reference Example 2 suffered from drastic increase in pressure loss due to the carrying of a catalyst, and the evaluation of its pressure loss was "fail" (X).

The ceramic honeycomb filters of Examples 8 and 9 were "pass" (○) in that their pressure loss difference AP before and after capturing carbon powder was in a practically permitted range, while the honeycomb filter of Reference Example 2 was "fail" (X) in that its pressure loss difference ΔP exceeded a practically permitted range.

As described above, the ceramic honeycomb filters of Examples 8 and 9, in which the maximum of the slope $S_n$ of the cumulative pore volume curve was 0.7 or more, suffered from little increase in pressure loss even after carrying a catalyst, and their pressure loss increase by the capturing of carbon powder was also small, verifying that they were excellent in filter performance.

EXAMPLES 10–14, REFERENCE EXAMPLES 3–7

A cordierite material powder mixture having the same composition as in Example 1 was blended, extrusion-molded to a honeycomb green body, and sintered at 1400° C., to obtain a cordierite honeycomb structure having an outer diameter of 267 mm, a length of 305 mm, a partition wall thickness of 0.3 mm, a partition wall pitch of 1.47 mm, and an outer peripheral wall thickness of 1.5 mm.

A sealer slurry made of a cordierite material was filled in the end portions of the flow paths of the cordierite honeycomb structure, in such a manner that the end portions of the flow paths were sealed alternately, and that both ends of the flow paths were sealed near the outer peripheral wall, followed by drying and sintering, to obtain a cordierite honeycomb filter of 305 mm in total length. To control the length of sealers sealing both ends of the flow paths near an outer periphery wall from a filter end surface, and a range in which flow paths having both ends sealed existed (shown by a radial length from the outer peripheral wall toward the center at a filter end surface), the filling conditions of the sealer slurry were adjusted.

After an exhaust gas of a diesel engine containing particulates was caused to flow through the resultant cordierite honeycomb filter to capture particulates, the particulates were burned to regenerate the filter. The measurement results of regeneration ratio and pressure loss were shown in Table 4. In Table 4, the relative length of flow paths having both ends sealed is [(length, from filter end surface, of sealers sealing both ends of flow paths near outer peripheral wall)/(total length of filter)]×100. The range of flow paths having both ends sealed in the end surface of the filter is a range expressed by a radial length from the outer peripheral wall toward the center of the filter, in which there are flow paths having both ends sealed.

The regeneration ratio is [(amount of captured particulates−amount of particulates remaining after regeneration)/(amount of captured particulates)]×100 (%). The regeneration ratio was evaluated according to the following standards:

◎: Regeneration ratio was 90% or more (pass).

○: Regeneration ratio was 80% or more (pass).

X: Regeneration ratio was less than 80% (fail).

The pressure loss was measured with air in a flow rate of 7.5 $Nm^3$/min, and evaluated according to the following standards:

◎: Pressure loss was 200 mmAq or less (pass).

○: Pressure loss was more than 200 mmAq and 250 mmAq or less (pass).

X: Pressure loss was more than 250 mmAq (fail).

The overall evaluation was made according to the following standards:

◎: Both of regeneration ratio and pressure loss were

○: Both of regeneration ratio and pressure loss were "pass."

X: Any one of regeneration ratio and pressure loss was "fail."

As is clear from Table 4, in Examples 10–14, because sealers sealing both ends of the flow paths near the outer peripheral wall were as long as 8.2% or less of the total length of the filter, and because flow paths having both ends sealed near the outer peripheral wall were within a range of 5 times the partition wall pitch at maximum from the outer peripheral wall toward the center of the filter, both of the regeneration ratio and the pressure loss were "pass" as ○ or ◎, and both of their overall evaluations were, "pass." Particularly in Example 13, the sealers sealing both ends of the flow paths near the outer peripheral wall met the requirement that their length from a filter end surface was 3.3% or less of the total length of the filter, and the flow paths having both ends sealed near the outer peripheral wall met the requirement that they existed within a range of three times the partition wall pitch at maximum from the outer peripheral wall toward the center of the filter. Accordingly, the filter of Example 13 was ◎ in any of regeneration ratio, pressure loss and overall evaluation.

In Reference Examples 3–7, because the length of sealers sealing both ends of the flow paths near the outer peripheral wall exceeded 8.2% of the total length of the filter, there is large dissipation of combustion heat via sealers at the time of burning particulates. Therefore, its regeneration ratio was "fail" (X), and its overall evaluation was also X.

Particularly in Reference Example 6, a range in which flow paths having both ends sealed near its outer peripheral wall existed stretched beyond 5 times the partition wall pitch at maximum from the outer peripheral wall toward the center of the filter. The flow paths having both ends sealed near the outer peripheral wall thus had a large adiabatic effect. Accordingly, though the regeneration ratio was ◎, the number of flow paths having a filter function was substantially decreased, so that the pressure loss was "fail" (X), and the overall evaluation was also "fail" (X)

Because the filter of Reference Example 7 did not have flow paths having both ends sealed near the outer peripheral wall, there was no adiabatic effect by the flow paths near its outer peripheral wall, so that the regeneration ratio was "fail" (X), and the overall evaluation was also "fail" (X).

EXAMPLES 15 AND 16

A cordierite material powder mixture was blended and extrusion-molded to a honeycomb structure in the same manner as in Example 10. After the predetermined flow paths of the honeycomb structure were sealed at both ends, it was sintered at 1400° C. to obtain a cordierite honeycomb sintered body. The sintered body machined to remove its periphery was coated with a slurry comprising 100 parts by mass of a cordierite aggregate having an average particle size of 15 μm, 10 parts by mass of colloidal silica, a binder and water on an outer periphery surface thereof, to form an outer peripheral wall. Thereafter, the outer peripheral wall was dried and sintered to obtain a cordierite honeycomb filter having the following size:

Outer diameter: 267 mm,

Total length: 305 mm,

Thickness of partition walls: 0.3 mm,

Pitch of partition walls: 1.47 mm, and

Thickness of outer peripheral wall: 1.5 mm.

The regeneration ratio and the pressure loss of each honeycomb filter were evaluated in the same manner as in Example 4. The results are shown in Table 4. In both Examples 15 and 16, the sealers sealing both ends of the flow paths near the outer peripheral wall met the requirement that their length was 8.2% or less of the total length of the filter, and the flow paths having both ends sealed near the outer peripheral wall met the requirement that they were within a range of 5 times the partition wall pitch at maximum from the outer peripheral wall toward the center of the filter. As a result, the filters of Examples 15 and 16 were "pass" as ○ or ◎ in the regeneration ratio and the pressure loss, and both of their overall evaluations were "pass."

TABLE 4

| | Flow Paths Having Both Ends Sealed Near Outer Peripheral Wall | | | Evaluation Results | | |
|---|---|---|---|---|---|---|
| No. | yes or no | Relative Length (%) | Range | Regeneration Ratio | Pressure Loss | Overall Evaluation |
| Example 10 | yes | 8 | 4 × Pp(1) | ○ | ○ | ○ |
| Example 11 | yes | 5 | 4 × Pp | ○ | ○ | ○ |
| Example 12 | yes | 3 | 4 × Pp | ◎ | ○ | ○ |
| Example 13 | yes | 3 | 2 × Pp | ◎ | ◎ | ◎ |
| Example 14 | yes | 5 | 2 × Pp | ◎ | ◎ | ○ |
| Ref. Ex. 3 | yes | 12 | 2 × Pp | × | ◎ | × |
| Ref. Ex. 4 | yes | 15 | 2 × Pp | × | ◎ | × |
| Ref. Ex. 5 | yes | 50 | 2 × Pp | × | ◎ | × |
| Ref. Ex. 6 | yes | 3 | 7 × Pp | ◎ | × | × |
| Ref. Ex. 7 | no | — | — | × | ◎ | × |

TABLE 4-continued

| No. | Flow Paths Having Both Ends Sealed Near Outer Peripheral Wall: yes or no | Relative Length (%) | Range | Evaluation Results: Regeneration Ratio | Pressure Loss | Overall Evaluation |
|---|---|---|---|---|---|---|
| Example 15 | yes | 3 | 2 × Pp | ⊚ | ⊚ | ⊚ |
| Example 16 | yes | 5 | 2 × Pp | ⊚ | ⊚ | ○ |

Note: [(1)]Partition wall pitch.

EXAMPLES 17–24, REFERENCE EXAMPLES 8–11

A cordierite material powder mixture having the same composition as in Example 1 was blended and extension-molded to provide a green bodies having a honeycomb shape. Each green body was sintered at a temperature of 1425° C. to produce a cordierite honeycomb structure. This honeycomb structure was in a cylindrical shape having a diameter of 143.8 mm and a length of 152.4 mm with a partition wall thickness of 0.3 mm, a partition wall pitch of 1.8 mm and a porosity of 65%.

Figure 10A:
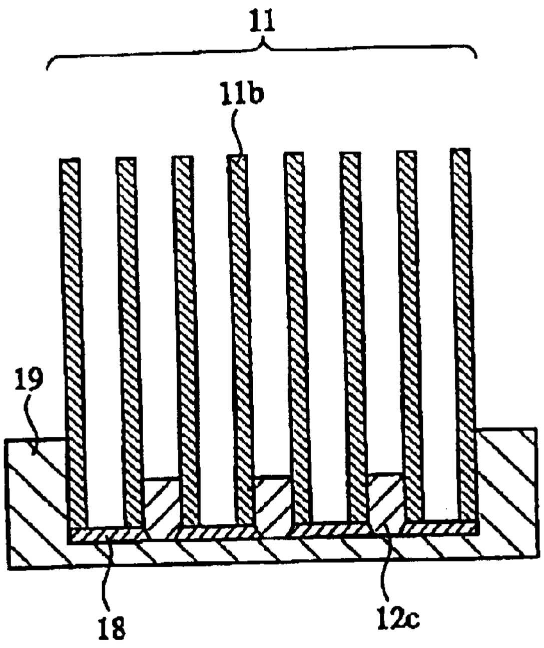
FIG. 10(*a*) is a schematic cross-sectional view showing a resin mask mounted onto a ceramic honeycomb filter to seal it.
Figure 10B:
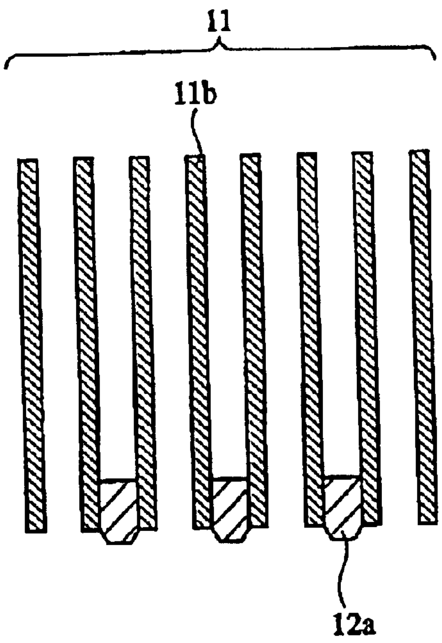

As shown in FIG. 10(*a*), with the predetermined openings of the honeycomb structure at one end covered by a resin mask 18, the honeycomb structure on the covered side was immersed in the same sealer slurry as in Example 10 to such a depth that the resultant sealers were as long as 10 mm. After drying the slurry, the resin mask 18 was removed to obtain a ceramic honeycomb filter having sealers projecting from its end surface as shown in FIG. 10(*b*). By adjusting the thickness and shape of the resin mask 18, the sealer slurry, etc., sealers 12 having shapes as shown in FIGS. 8(*a*), (*b*) were provided with various projection lengths. 10-mm-long sealers 12 were also formed in the filter on the other end surface. Each sealer 12 had a surface roughness Ry of 76 μm.

The projection length $L_P$ of sealers 12 in the honeycomb filter on the end surface on the exhaust-gas-entering side was obtained by averaging the projection lengths of arbitrary five sealers. When the sealers 12 are retreated from the end surface of the filter, the projection length $L_P$ of the sealers is shown by minus.

Figure 11A:
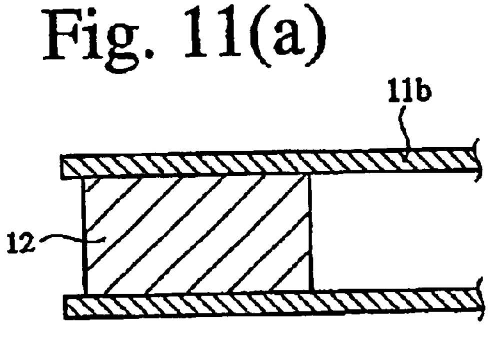
FIG. 11(*a*) is an enlarged cross-sectional view showing the sealing of the ceramic honeycomb filter of Reference Example 10.
Figure 11B:
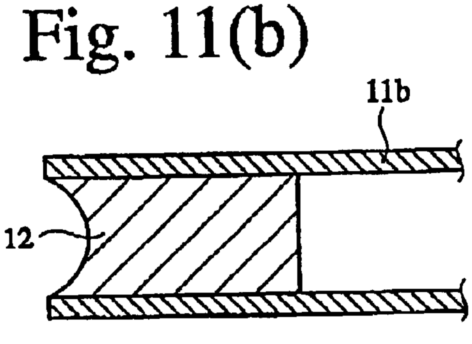

Ceramic honeycomb filters having 10-mm-long sealers 12 having various end surface shapes as shown in FIGS. 7(*a*), (*c*) and FIGS. 11 (*a*), (*b*) were also produced. Each sealer 12 had a surface roughness Ry of 76 μm.

After carbon powder having a particle size of 0.42 μm was charged into each honeycomb filter at a rate of 3 g/h for 2 hours, the pressure loss of each honeycomb filter was measured by a pressure loss test stand, and evaluated according to the following standards:

⊚: Excellent pressure loss was less than 360 mmAq).

○: Good (pressure loss was 360 mmAq or more and less than 400 mmAq).

Δ: Fair (pressure loss was 400 mmAq or more and less than 450 mmAq).

X: Poor (pressure loss was 450 mmAq or more).

The results are shown in Table 5.

TABLE 5

| No. | Shape of Sealer | Projection Length $L_P$ of Sealer (mm) | Pressure Loss |
|---|---|---|---|
| Example 17 | FIG. 8 (a) | 0.01 | ○ |
| Example 18 | FIG. 8 (a) | 0.06 | ⊚ |
| Example 19 | FIG. 8 (a) | 1.00 | ⊚ |
| Example 20 | FIG. 8 (a) | 1.98 | ⊚ |
| Example 21 | FIG. 8 (a) | 4.95 | ○ |
| Example 22 | FIG. 8 (b) | 0.01 | ⊚ |
| Example 23 | FIG. 8 (b) | 1.00 | ⊚ |
| Example 24 | FIG. 8 (b) | 4.31 | ○ |
| Ref. Ex. 8 | FIG. 7 (a) | 0.00 | × |
| Ref. Ex. 9 | FIG. 7 (c) | 0.00 | × |
| Ref. Ex. 10 | FIG. 11 (a) | −0.25 | × |
| Ref. Ex. 11 | FIG. 11 (b) | −0.35 | × |

As shown in Table 5, the honeycomb filters of Examples 17–24 had sealers 12 projecting from the filter end surfaces, they showed pressure loss of ○ or ⊚, proving that there was little increase in pressure loss. On the other hand, the honeycomb filters of Reference Examples 8–11 had sealers 12 not projecting from the filter end surfaces, particulates are likely to be accumulated, resulting in pressure loss of x, proving that there was large increase in pressure loss.

Figure 12:
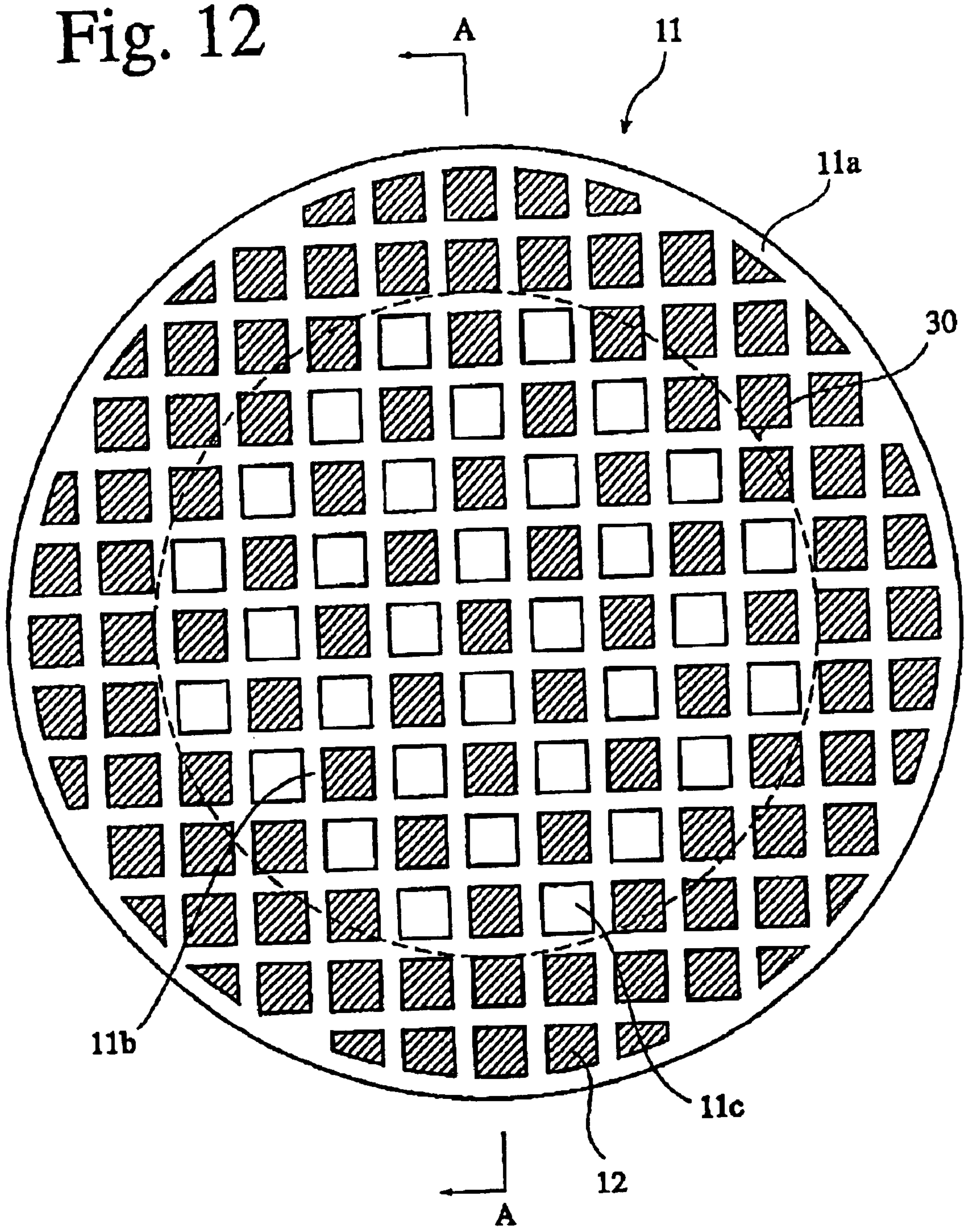
FIG. 12 is an end view showing another example of the ceramic honeycomb filter of the present invention.
Figure 13:
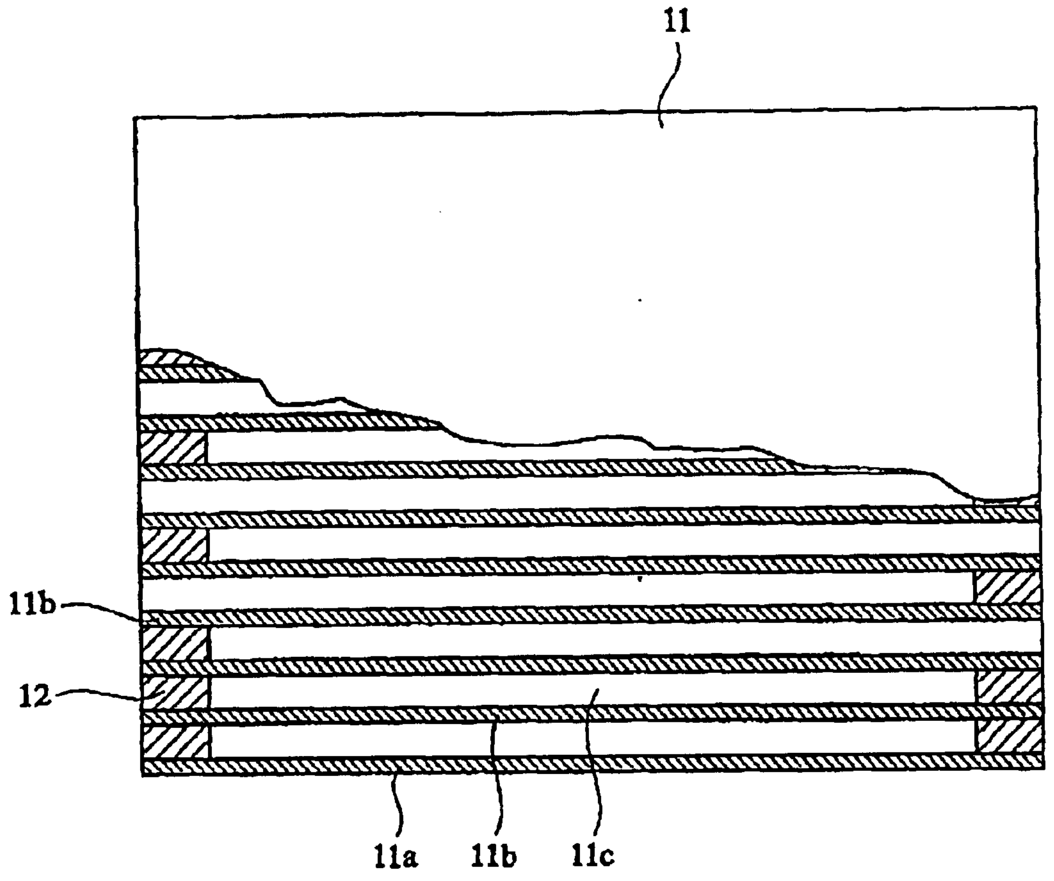
FIG. 13 is a cross-sectional view taken along the line A—A in FIG. 12.
Figure 14A:
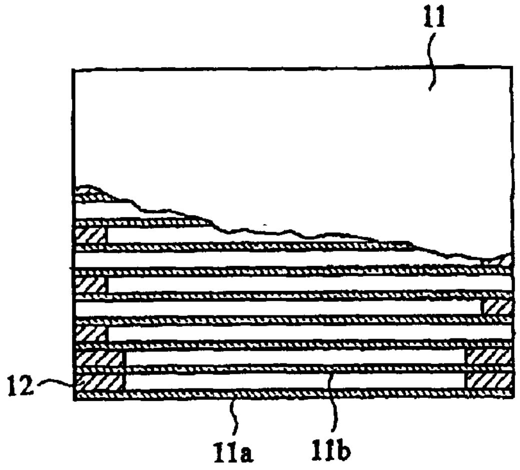
FIG. 14(*a*) is a partially cross-sectional side view showing a further example of the ceramic honeycomb filter of the present invention.
Figure 14B:
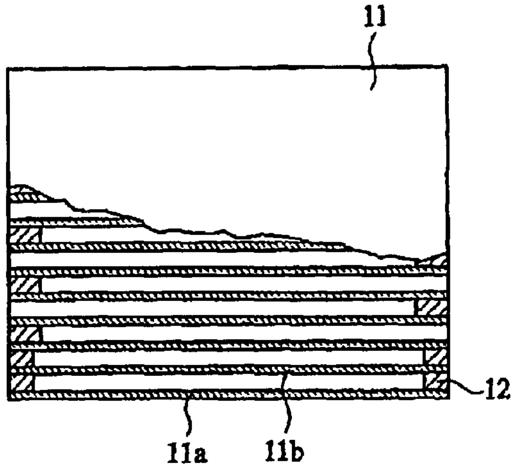
Figure 14C:
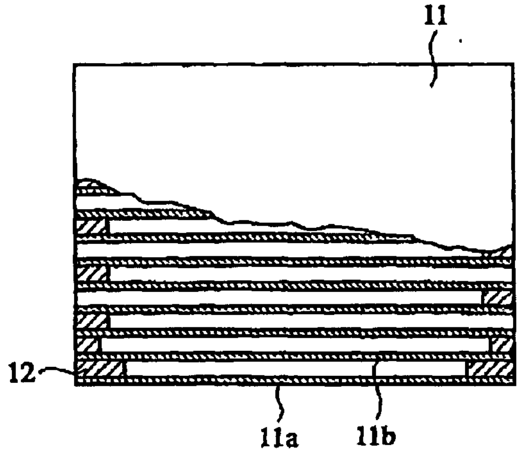
Figure 14D:
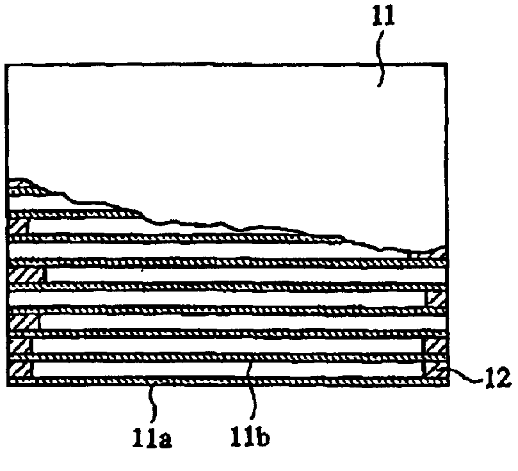

FIG. 12 shows a further example of the ceramic honeycomb filter of the present invention, and FIG. 13 is a cross-sectional view taken along the line A—A in FIG. 12. A chain line 30 indicates a range of a radial length corresponding to two times the partition wall pitch from the outer peripheral wall 11*a* toward the center of the filter. The flow paths existing within a range between the chain line 30 and the outer peripheral wall 11*a* have both ends sealed As examples of the filter 11 having flow paths having both ends sealed near the outer peripheral wall 11*a*, there are other examples shown in FIGS. 14(*a*)–(*d*), in addition to those shown in FIGS. 12 and 13.

Figure 9:
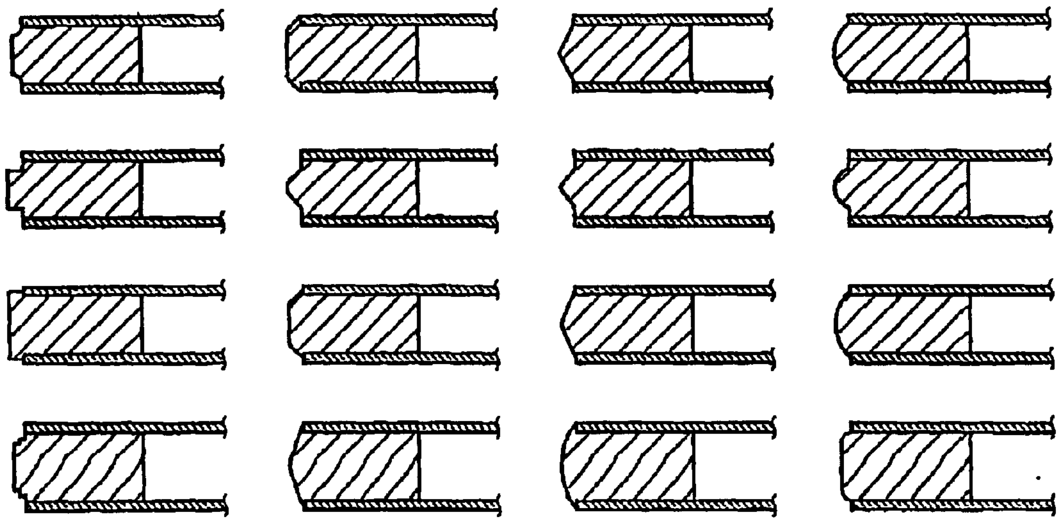
FIG. 9 is an enlarged cross-sectional view showing various examples of the sealing of the ceramic honeycomb filter of the present invention.

Though the present invention has been explained referring to the attached drawings, the present invention is not restricted to the shapes of sealers shown in FIGS. 8(*a*), (*b*) and FIG. 9. The cross section shape of the ceramic honeycomb structure is not restricted to be cylindrical, but may be in any other shapes such as an oval shape, etc.

Because the maximum of the slope $S_n$ of the cumulative pore volume curve of partition wall pores is 0.7 or more in the ceramic honeycomb structure of the present invention, the ceramic honeycomb structure satisfies contradictory properties of low pressure loss and high particulates-capturing efficiency when used as a diesel particulate filter, even though it has as large as 60–75% of porosity and as large as 15–25 μm of an average pore diameter. In addition, the ceramic honeycomb filter of the present invention is not broken under thermal stress and thermal shock stress during use and mechanical stress by fastening in assembling and vibration, exhibiting excellent durability. Further, the ceramic honeycomb filter of the present invention has such long particulates-capturable time that the removal of particulates can be carried out with high efficiency at the time of regenerating the filter.

What is claimed is:

1. A ceramic honeycomb filter comprising a ceramic honeycomb structure having porous partition walls defining a plurality of flow paths for flowing an exhaust gas through said porous partition walls to remove particulates from said exhaust gas, the predetermined flow paths among said flow paths being sealed at their ends, said porous partition walls having a porosity of 60–75% and an average pore diameter of 15–25 μm when measured according to a mercury penetration method, and the maximum of a slope $S_n$ of a cumulative pore volume curve of said porous partition walls relative to a pore diameter obtained at an n-th measurement point being 0.7 or more, said $S_n$ being represented by the following formula (1):

$$S_n=-(V_n-V_{n-1})/[\log D_n-\log (D_{n-1})] \quad (1),$$

wherein $D_n$ is a pore diameter (μm) at an n-th measurement point, $D_{n-1}$ is a pore diameter (μm) at an (n−1)-th measurement point, $V_n$ is a cumulative pore volume ($cm^3/g$) at an n-th measurement point, and $V_{n-1}$ is a cumulative pore volume ($cm^3/g$) at an (n−1)-th measurement point.

2. The ceramic honeycomb filter according to claim 1, wherein the maximum of the slope $S_n$ of the cumulative pore volume curve of said porous partition walls is 0.9 or more.

3. The ceramic honeycomb filter according to claim 1, wherein said porous partition walls have a porosity of 65–70%.

4. The ceramic honeycomb filter according to claim 1, wherein said porous partition walls have an average pore diameter of 18–22 μm.

5. The ceramic honeycomb filter according to claim 1, wherein said ceramic honeycomb structure is made of a porous ceramic having a main component chemical composition substantially comprising 42–56% by mass of $SiO_2$, 30–45% by mass of $Al_2O_3$, and 12–16% by mass of MgO, a main component of its crystal phase being cordierite.

6. A ceramic honeycomb filter comprising a ceramic honeycomb structure having porous partition walls defining a plurality of flow paths for flowing an exhaust gas through said porous partition walls to remove particulates from said exhaust gas, the predetermined flow paths among said flow paths being sealed at their ends, flow paths near its outer peripheral wall being sealed by sealers at both ends, the length of said sealers from a filter end surface being 8.2% or less of the total length of said filter, and said flow paths having both ends sealed existing within a range of a radial length corresponding to 5 times the partition wall pitch at maximum from the outer periphery toward the center of said filter.

7. The ceramic honeycomb filter according to claim 1, wherein flow paths near its outer peripheral wall are sealed by sealers at both ends, the length of said sealers from a filter end surface is 8.2% or less of the total length of said filter, and said flow paths having both ends sealed exist within a range of a radial length corresponding to 5 times the partition wall pitch at maximum from the outer periphery toward the center of said filter.

8. A ceramic honeycomb filter comprising a ceramic honeycomb structure having porous partition walls defining a plurality of flow paths for flowing an exhaust gas through said porous partition walls to remove particulates from said exhaust gas, the predetermined flow paths among said flow paths being sealed at their ends, a pitch of said porous partition walls being 2.54 mm or less, at least some of said sealers sealing flow paths except for those near its outer periphery wall projecting from the end surfaces of said partition walls by 0.01–5 mm in a flow path direction.

9. The ceramic honeycomb filter according to claim 1, wherein a pitch of said porous partition walls is 2.54 mm or less, and at least some of said sealers sealing flow paths except for those near its outer periphery wall projecting from the end surfaces of said partition walls by 0.01–5 mm in a flow path direction.

10. The ceramic honeycomb filter according to claim 7, wherein a pitch of said porous partition walls is 2.54 mm or less, and at least some of said sealers sealing flow paths except for those near its outer periphery wall projecting from the end surfaces of said partition walls by 0.01–5 mm in a flow path direction.

11. A ceramic honeycomb filter comprising a ceramic honeycomb structure having porous partition walls defining a plurality of flow paths for flowing an exhaust gas through said porous partition walls to remove particulates from said exhaust gas, the predetermined flow paths among said flow paths being sealed at their ends, a catalyst being carried by said porous partition walls, said porous partition walls having a porosity of 60–75% and an average pore diameter of 15–25 μm when measured according to a mercury penetration method, and the maximum of a slope $S_n$ of a cumulative pore volume curve of said porous partition walls relative to a pore diameter obtained at an n-th measurement point being 0.7 or more, said $S_n$ being represented by the following formula (1):

$$S_n=-(V_n-V_{n-1})/[\log D_n-\log (D_{n-1})] \quad (1),$$

wherein $D_n$ is a pore diameter (μm) at an n-th measurement point, $D_{n-1}$ is a pore diameter (μm) at an (n−1)-th measurement point, $V_n$ is a cumulative pore volume ($cm^3/g$) at an n-th measurement point, and $V_{n-1}$ is a cumulative pore volume ($cm^3/g$) at an (n−1)-th measurement point.

12. The ceramic honeycomb filter according to claim 11, wherein flow paths near its outer peripheral wall are sealed by sealers at both ends, the length of said sealers from a filter end surface is 8.2% or less of the total length of said filter, and said flow paths having both ends sealed exist within a range of a radial length corresponding to 5 times the partition wall pitch at maximum from the outer periphery toward the center of said filter.

13. The ceramic honeycomb filter according to claim 11, wherein a pitch of said porous partition walls is 2.54 mm or less, and at least some of said sealers sealing flow paths except for those near its outer periphery wall projecting from the end surfaces of said partition walls by 0.01–5 mm in a flow path direction.

14. The ceramic honeycomb filter according to claim 12, wherein a pitch of said porous partition walls is 2.54 mm or less, and at least some of said sealers sealing flow paths except for those near its outer periphery wall projecting from the end surfaces of said partition walls by 0.01–5 mm in a flow path direction.

* * * * *